3,012,847
PROCESS FOR WET SPINNING
CELLULOSE TRIESTERS
Richard N. Rulison, Summit, N.J., assignor to Celanese Corporation of America, New York, N.Y., a corporation of Delaware
No Drawing. Filed Apr. 28, 1959, Ser. No. 809,362
7 Claims. (Cl. 18—54)

This invention relates to an extruding process and relates more particularly to a process for extruding highly substituted organic acid esters of cellulose.

An important object of this invention is to provide a process for extruding highly substituted organic acid esters of cellulose which will yield products having good physical properties.

Other objects of this invention will be apparent from the following detailed description and claims.

It has long been known that filamentary materials, films and similar products could be prepared from organic acid esters of cellulose by extruding operations in which a solution of said esters was passed through a shaping aperture into a liquid coagulating medium. Generally, there was employed in these operations the so-called "secondary" esters in which approximately two out of every three hydroxyl groups in each anhydroglucose unit in the cellulose molecule were esterified. These extruding operations yielded satisfactory products. When an attempt was made to extrude more highly substituted organic acid esters of cellulose, commonly known as cellulose triesters, in this manner a number of difficulties were encountered. The products produced by this process had poor physical properties and an unsatisfactory appearance. In addition, the extruding operation was unstable and interruptions owing to breaks and other defects were frequent.

According to the present invention, the foregoing difficulties are overcome and the extruding of highly substituted organic acid esters of cellulose is successfully carried out by extruding a solution of said cellulose esters into an aqueous bath containing a water-miscible organic ester. The products obtained through the use of this process have good physical properties and a satisfactory appearance. In addition, extruding proceeds smoothly without an excessive number of breaks or other interruptions.

The organic acid esters of cellulose to which the process of this invention is applicable are those containing fewer than about 0.3 free hydroxyl groups or preferably fewer than about 0.1 free hydroxyl groups per anhydroglucose unit in the cellulose molecule. In the case of cellulose acetate, which is commercially the most widely used organic acid ester of cellulose, this corresponds to an acetyl value, calculated as acetic acid, of more than about 58.8% or preferably more than about 61.3% by weight. Examples of other suitable organic acid esters of cellulose are cellulose propionate, cellulose butyrate, cellulose acetate formate, cellulose acetate propionate and cellulose acetate butyrate.

The highly substituted organic acid esters of cellulose are dissolved in a suitable solvent or solvent mixture to form a solution. Examples of solvents that may be used for this purpose are acetic acid, acetone, ethylene chlorohydrin, dimethyl sulfoxide and dimethyl formamide. A preferred group of solvents are the chlorinated hydrocarbons, such as methylene chloride, ethylene chloride or chloroform, either alone or in admixture with a small proportion of an auxiliary solvent. Especially valuable results are obtained when methylene chloride is employed as the solvent, either alone or in admixture with up to about 20% by weight of a lower aliphatic alcohol such as methanol, ethanol, isopropanol, normal propanol or a butanol. The concentration of the organic acid esters of cellulose in the solution may range between about 15 and 30% by weight, depending upon the precise spinning conditions and the results it is desired to obtain.

The solution is pumped or otherwise forced through a suitable shaping aperture into the coagulating bath wherein the organic acid ester of cellulose is thrown out of solution. As the coagulating bath there is employed an aqueous bath containing an organic ester, preferably a lower aliphatic ester. Examples of suitable esters which may be used in carrying out the process of this invention are ethyl acetate, isopropyl acetate, isobutyl acetate, sec.-butyl acetate, t-butyl acetate, glycoldiacetate and diglycol diacetate. In addition to the simple esters, there may be used ether esters such as 2-methoxyethyl acetate, 2-ethoxyethylacetate, 2-(2-methoxyethoxy) ethyl acetate, 2-(2-ethoxyethoxy) ethyl acetate and the like. Similar esters of other lower fatty acids such as formic, propionic or butyric acid (e.g. butyl formate or methyl propionate) may be used. These esters are effective in surprisingly low concentrations, good results being achieved when the esters are present in amounts ranging between about 0.5 and 25% by weight, based on the total weight of the bath. The emperature of the bath may be held at between about 0 and 100° C.

The extruding operation may be carried out in any suitable form of apparatus, there being many known in the art. For example, in the spinning of filamentary materials, the spinning solution passes through a spinnerette containing at least one spinning aperture into the coagulating bath. The spinnerette may be positioned in a trough containing the bath. Alternatively, the spinnerette may be positioned in a column through which the bath flows. After passing through the bath, the products produced may be washed, if necessary, and then dried. Spinning proceeds with a minimum of breaks or other interruptions. In addition, the products obtained have good physical properties and satisfactory appearance so they are well suited for commercial use.

The following examples are given to illustrate this invention further.

*Example I*

Cellulose acetate having an acetyl value of 61.2% by weight, calculated as acetic acid, is dissolved in a solvent mixture containing 90% by weight of methylene chloride and 10% by weight of methanol to form a solution containing 26.2% by weight of cellulose acetate. The solution is filtered and spun through a spinnerette having 20 holes, each 0.042 mm. in diameter, into an open trough having therein a bath maintained at 24° C. and containing water together with 4.6% by weight of 2-methoxyethyl acetate. The yarn is drawn through the trough for a distance of 90 cm. and then withdrawn from the bath at a rate of 50 meters per minute, washed with water and dried. The yarn has a high luster and the individual filaments therein have a circular cross-section. The yarn has a total denier of 48.2.

*Example II*

The cellulose acetate solution described in Example I is spun through a spinnerette having 40 holes, each 0.042 mm. in diameter, and positioned at the base of a circular spinning column 140 cm. long and 1.75 cm. in diameter. An aqueous bath maintained at 28° C. and containing 1.6% by weight of ethyl acetate is pumped upwardly through the column at a rate of 2.6 liters per minute. The yarn is drawn from the top of the column at a rate of 53 meters per minute and dried. No washing is necessary since the ethyl acetate evaporates readily from the yarn during the drying process. The yarn has a high luster and the individual filaments therein have a circular cross-section. The yarn has a total denier of 148.4.

Example III

Cellulose acetate having an acetyl value of 61.0% by weight, calculated as acetic acid, is dissolved in a solvent mixture containing 90% by weight of methylene chloride and 10% by weight of methanol to form a solution containing 21.8% by weight of cellulose acetate. The solution is filtered and spun through a spinnerette having 20 holes, each 0.042 mm. in diameter, into an open trough having therein an aqueous bath maintained at 25° C. and containing 1.66% by weight of isopropyl acetate. The yarn is drawn through the trough for a distance of 90 cm. and then withdrawn from the bath at a rate of 69 meters per minute, washed and dried. The yarn has a high luster and the individual filaments therein have a circular cross-section. The yarn has a total denier of 60.2.

It is to be understood that the foregoing detailed description is merely given by way of illustration and that many variations may be made therein without departing from the spirit of my invention.

This application is a continuation in part of my earlier copending application Serial No. 514,780 filed June 10, 1955, and now abandoned.

Having described my invention, what I desire to secure by Letters Patent is:

1. Process for extruding organic acid esters of cellulose having fewer than about 0.3 free hydroxyl groups per anhydroglucose unit in the cellulose molecule, which comprises forcing a solution of said organic acid esters of cellulose in a chlorinated hydrocarbon through a shaping orifice into an aqueous bath having dissolved therein between about 0.5 and 25% by weight of an ester of lower fatty acid.

2. Process for extruding organic acid esters of cellulose having fewer than about 0.3 free hydroxyl groups per anhydroglucose unit in the cellulose molecule, which comprises forcing a solution of said organic acid esters of cellulose in a chlorinated hydrocarbon through a shaping orifice into an aqueous bath having dissolved therein between about 0.5 and 25% by weight of an acetic acid ester of an ether.

3. Process for extruding cellulose acetate having fewer than about 0.3 free hydroxyl groups per anhydroglucose unit in the cellulose molecule, which comprises forcing a solution of said cellulose acetate in a chlorinated hydrocarbon through a shaping orifice into an aqueous bath having dissolved therein between about 0.5 and 25% by weight of an acetic acid ester.

4. Process for extruding cellulose acetate having fewer than about 0.3 free hydroxyl groups per anhydroglucose unit in the cellulose molecule, which comprises forcing a solution of said cellulose acetate in methylene chloride through a shaping orifice into an aqueous bath having dissolved therein between about 0.5 and 25% by weight of an acetic acid ester.

5. Process for extruding cellulose acetate having fewer than about 0.3 free hydroxyl groups per anhydroglucose unit in the cellulose molecule, which comprises forcing a solution of said cellulose acetate in methylene chloride through a shaping orifice into an aqueous bath containing between about 0.5 and 25% by weight of ethyl acetate.

6. Process for extruding cellulose acetate having fewer than about 0.3 free hydroxyl groups per anhydroglucose unit in the cellulose molecule, which comprises forcing a solution of said cellulose acetate in methylene chloride through a shaping orifice into an aqueous bath containing between about 0.5 and 25% by weight of isopropyl acetate.

7. Process for extruding cellulose acetate having fewer than about 0.3 free hydroxyl groups per anhydroglucose unit in the cellulose molecule, which comprises forcing a solution of said cellulose acetate in methylene chloride through a shaping orifice into an aqueous bath containing between about 0.5 and 25% by weight of 2-methoxyethyl acetate.

References Cited in the file of this patent

UNITED STATES PATENTS

| | | |
|---|---|---|
| 2,143,205 | Muller | Jan. 10, 1939 |
| 2,552,598 | Sowter | May 15, 1951 |